UNITED STATES PATENT OFFICE.

ALOIS LÖW, OF VIENNA, AUSTRIA-HUNGARY, AND ERNST FISCHER, OF CHARLOTTENBURG, GERMANY.

PROCESS FOR THE MANUFACTURE OF GLUE, GELATIN, AND THE LIKE.

1,086,149.          Specification of Letters Patent.          Patented Feb. 3, 1914.

No Drawing.          Application filed January 16, 1912. Serial No. 671,455.

*To all whom it may concern:*

Be it known that we, ALOIS LÖW, manufacturer, resident of Vienna, Austria-Hungary, and Dr. ERNST FISCHER, chemist, resident of Charlottenburg, near Berlin, Germany, both subjects of the Emperor of Austria-Hungary, have invented a new and useful Improved Process for the Manufacture of Glue, Gelatin, and the like, of which the following is a specification.

Our invention relates to an improved process for producing glue and gelatin from bones.

An object of our invention is to provide an improved process for producing a maximum quantity of high grade glue from bones.

A further object of our invention is to provide an improved process for producing glue from bones, which prevents all danger of deterioration of the glue by the splitting up or decomposition of its constituents.

At present, glue is extracted from bone in successive stages by treating the bone with steam for several hours; the steam pressure being gradually raised from approximately one atmosphere in the first stage to approximately two and one-half atmospheres in the last stage. In this process, the protein compounds of the bone are split up or decomposed into less complex substances to form glue, probably by a hydrolytic reaction, and the constituents of the glue formed early in the process are in turn split up by the continuation of the heat in the steaming treatment; thereby causing material deterioration and loss of the glue.

In our improved process, the bones are treated with steam under a pressure of two and one-half atmospheres to three atmospheres for a period of from ten minutes to fifteen minutes. This causes a rapid conversion of the protein compounds of the bone into a high grade glue. The hot steamed bones from the previous treatment are then subjected to a vacuum to cause a rapid evaporation of the hot condensed steam which has permeated the bones in the previous step; thereby quickly cooling the bones throughout their entire mass to prevent deterioration of the glue by the splitting up of its constituents. The cooled bones are then treated with low pressure steam in the presence of a vacuum to supply sufficient hot water of condensation for thoroughly dissolving the glue and removing the latter from the bones. While this is our preferred method for removing the glue, it could obviously be removed by any of the well known methods.

By our above described improved method, we prevent all danger of deterioration or splitting up of the glue, and insure the production of a much greater quantity of high grade glue than is extractable from bones by previous methods.

We claim:—

1. The herein described process for producing glue from bone, which consists in treating bone with steam at a pressure of two and one-half to three atmospheres for a period not exceeding fifteen minutes to rapidly convert the protein compounds of the bone into glue, and then subjecting the hot steamed bone to a vacuum to produce a quick cooling throughout the entire mass of the bone by causing a rapid evaporation of a portion of, and a cooling within the bones of the remainder of the hot condensed steam which has permeated the bone in the preceding step.

2. The herein described process for producing glue from bone, which consists in treating the bone with steam at a pressure of substantially two and a half atmospheres for a period not greater than fifteen minutes, then subjecting the hot steamed bone to a vacuum for rapidly cooling the bone, simultaneously treating the cooled bone with low pressure steam in the presence of a vacuum for supplying sufficient condensed steam to thoroughly dissolve and remove the glue from the bone.

In testimony, that we claim the foregoing as our invention, we have signed our names in presence of two witnesses, this second day of January 1912.

ALOIS LÖW.
        DR. ERNST FISCHER.

Witnesses:
    FRIEDRICH MÜSSEN,
    HEINRICH ADAM.